US009572308B1

(12) United States Patent
Beggs et al.

(10) Patent No.: US 9,572,308 B1
(45) Date of Patent: Feb. 21, 2017

(54) SPRAY BOOM NOZZLE SPOILER DEVICE AND SYSTEM

(71) Applicant: K-B Agri Tech, LLC, Plainfield, WI (US)

(72) Inventors: Robert Dale Beggs, Plainfield, WI (US); Kurt William Kamin, Plainfield, WI (US)

(73) Assignee: K-B Agri Tech, LLC, Plainfield, WI (US)

( * ) Notice: Subject to any disclaimer, the term of this patent is extended or adjusted under 35 U.S.C. 154(b) by 343 days.

(21) Appl. No.: 14/292,071

(22) Filed: May 30, 2014

(51) Int. Cl.
*B05B 1/20* (2006.01)
*A01G 25/09* (2006.01)

(52) U.S. Cl.
CPC .................................... *A01G 25/09* (2013.01)

(58) Field of Classification Search
CPC ..... A01G 25/09; A01M 7/005; A01M 7/0053; A01M 7/0057; A01M 7/006; A01M 7/0064; A01M 7/0067; A01M 7/0071; A01M 7/0075; A01M 7/0078
USPC ....... 239/159, 722, 723, 160, 161, 162, 163, 239/172
See application file for complete search history.

(56) References Cited

U.S. PATENT DOCUMENTS 1,109,060 A * 9/1914 Griffin ................ A01M 21/043 43/132.1
1,527,669 A * 2/1925 Camp ................. A01M 21/043 47/1.5
2,223,809 A * 12/1940 Rucker ............... A01M 21/043 15/97.1
2,555,826 A * 6/1951 Tallman ................ E01C 19/176 239/104
3,829,019 A * 8/1974 Petsch ..................... A47L 11/38 15/50.1
4,274,589 A * 6/1981 Jones ................. A01M 7/0064 134/183
4,302,904 A * 12/1981 Mead .................. A01M 21/043 47/1.5
4,583,319 A 4/1986 Wolff et al.
4,641,781 A 2/1987 McRea et al.
4,746,065 A 5/1988 Gorder
4,813,175 A 3/1989 Meyer
4,927,080 A 5/1990 Alsing
(Continued)

FOREIGN PATENT DOCUMENTS

CA 546395 9/1957

*Primary Examiner* — Justin Jonaitis
(74) *Attorney, Agent, or Firm* — Charles S. Sara; DeWitt Ross & Stevens S.C.

(57) ABSTRACT

A field spraying device for spraying a liquid on a crop, includes a liquid supply tank, at least one spray boom extending from the device, the spray boom having a forward side facing the directional movement of the field spraying device in operation and an opposing rearward side, wherein the boom includes a liquid supply line connected to a plurality of nozzles along the length of the boom for spraying a field with the liquid. Further, there are a plurality of wind drift spoiler devices wherein each wind drift spoiler device is position adjacent each of the nozzles on the forward side of the spray boom. The wind drift spoiler devices include a downwardly depending deflector surface adjacent each of the nozzles. The wind drift spoiler device may also be equipped with a downwardly depending brush element, wherein the brush element is positioned to depend downwardly from the deflector surface.

15 Claims, 3 Drawing Sheets

(56) References Cited

U.S. PATENT DOCUMENTS

| | | | | |
|---|---|---|---|---|
| 5,062,572 | A * | 11/1991 | Reiter | A01M 7/0064 239/290 |
| 5,098,018 | A | 3/1992 | Hadar et al. | |
| 5,241,780 | A | 9/1993 | Zaun et al. | |
| 5,310,116 | A * | 5/1994 | Broyhill | B05B 15/0443 239/172 |
| 5,361,991 | A * | 11/1994 | Baran, Jr. | B05B 15/04 239/165 |
| 5,361,992 | A | 11/1994 | Broyhill | |
| 5,366,154 | A | 11/1994 | Thompson | |
| 5,402,945 | A | 4/1995 | Swanson, Jr. | |
| 5,419,493 | A | 5/1995 | Redway | |
| 5,431,341 | A | 7/1995 | Broyhill | |
| 5,680,991 | A | 10/1997 | Truitt | |
| 5,836,399 | A | 11/1998 | Maiwald et al. | |
| 5,884,844 | A | 3/1999 | Truitt | |
| 6,101,798 | A | 8/2000 | Thagard et al. | |
| 6,334,578 | B1 * | 1/2002 | House | A01M 7/0014 239/159 |
| 6,637,152 | B1 | 10/2003 | Nunn | |
| 6,786,425 | B2 | 9/2004 | Rawlings | |
| 7,077,070 | B1 | 7/2006 | Williams | |
| 7,124,964 | B2 | 10/2006 | Bui | |
| 7,837,130 | B1 | 11/2010 | Lowery | |
| 2006/0011741 | A1 * | 1/2006 | Hahn | A01M 7/0064 239/172 |

* cited by examiner

SPRAY BOOM NOZZLE SPOILER DEVICE AND SYSTEM

FIELD OF THE INVENTION

The present invention relates generally to a spraying system, and more particularly to a crop spraying system. Specifically, the present invention is directed to a device and system for minimizing spray drift.

DESCRIPTION OF PRIOR ART

The present invention is directed to a machine and system typically used for spraying agricultural crops in rows with an atomized, charged, water solution produced by a series of nozzles. Due to the trend in agriculture of improved crop genetics, minimum tillage operations, increased efficiency and better environmental stewardship, growers are relying more and more on sprayer applied crop protection inputs. On a large scale basis, the spraying operation is generally supplied by means of a tractor or a truck on which a sprayer is attached. Generally, sprayers include a pair of booms extending outwardly from the tractor which includes a liquid supply tank containing the liquid to be sprayed. The sprayers come in a variety of lengths and can have an overall length of 50 feet or greater. Each boom includes at least one and preferably several spray nozzles for spraying the liquid on the crop or ground.

A problem with this system is that a substantial portion of the sprayed product is wasted due to the combined problems of spray drift, spray pattern degradation and off-target application. This is not only costly but could be dangerous when excess chemicals from the aqua spray are atomized and allowed to circulate through the air. These chemicals could settle on other land and, more dangerously, drinking water locations.

Most agricultural crop protection products are applied as sprays, consisting of small droplets that are by nature very light. When wind, turbulence or unexpected gusts occur, these droplets often drift to places other than their desired settling point while they are still suspended in the air. In addition to potential EPA violations, this problem also reduces the efficacy of the product being applied by causing uneven application or missing the intended target altogether.

As a spray boom travels across the field sometimes up to 20 mph, air flowing through the boom structure becomes turbulent. The spray line with the nozzle bodies and spray tips are located inside the boom structures near the bottom edge of the boom where most turbulence is being generated. This turbulence negatively affects product placement and increases spray drift as the spray pattern develops. This not only has cost implications, but it can also have serious environmental problems.

Even without any ambient wind, the speed at which most agricultural grounds sprayers travel results in substantial air turbulence over and through the spray boom structure. At the relatively slow speed of just 8 mph, the air starts to curl and accelerate around the spray boom structure and deflect the spray from the nozzle tip. Most operators travel at 12-15 mph. At that speed, the spray pattern can completely disintegrate. It also changes the droplet size and can cause chemicals to disperse away from the intended target.

Typically, a spraying operation is open to the elements and subject to a variety of environment elements, most notably wind and the movement of sprayer along the ground. These elements can be detrimental in creating conditions which cause drifting of the spray exiting the nozzles. The spray is often atomized and can be lighter than air when it leaves the nozzle. Any variation of the environment could cause the spray to drift to places other than the crop or ground.

To counteract this condition, some operators attempt to improve product placement and minimize spray drift, including air induction spray tips, nozzles that pulse off and on to control product flow while maintain a desirable pressure range to minimize drift, and spray tip designs that address maximizing droplet size. Prior art units to contain spray drift are known. For example, there is an "air curtain" spray boom that has rigid shields in front of and behind the spray nozzle. However, these are neither practical nor durable. Some operators provide an all-encompassing cover for the spray boom and nozzle to attempt to minimize any drifting of the spray. Examples of such covers can be found in U.S. Pat. No. 4,641,781 to McRea et al. and U.S. Pat. No. 4,927,080 to Alsing. However, the products disclosed therein are cumbersome in that they attempt to cover the entire boom structure with a cowling, which can be both expensive and heavy, adding weight to the overall structure of the spraying machine.

SUMMARY OF THE INVENTION

The present invention is directed to a field spraying device for spraying a liquid on a crop, comprising a liquid supply tank; at least one spray boom extending from the device, the spray boom having a forward side facing the directional movement of the field spraying device in operation and an opposing rearward side, wherein the boom includes a liquid supply line connected to a plurality of nozzles along the length of the boom for spraying a field with the liquid; and at least one wind drift spoiler device positioned adjacent one of the plurality of nozzles on the forward side of the spray boom, wherein the wind drift spoiler device comprises a downwardly depending deflector surface adjacent the nozzle.

The present invention is more particularly directed to a field spraying device for spraying a liquid on a crop, comprising a liquid supply tank; at least one spray boom extending from the device, the spray boom having a forward side facing the directional movement of the field spraying device in operation and an opposing rearward side, wherein the boom includes a liquid supply line connected to a plurality of nozzles along the length of the boom for spraying a field with the liquid; and a plurality of wind drift spoiler devices wherein each of plurality of wind drift spoiler devices is position adjacent each of the nozzles on the forward side of the spray boom, wherein the wind drift spoiler devices each include a downwardly depending deflector surface adjacent each of the nozzles, wherein the wind drift spoiler device includes a downwardly depending brush element, wherein the brush element is positioned to depend downwardly from the deflector surface.

Advantageously, the spray control device of the present invention improves spray control and, more importantly, dramatically reduces spray drift without sacrificing the ability to visually monitor each spray tip from the operator's seat. In addition and due to the light weight of the spray control device, the spray control device of the present invention provides little added weight to the entire spraying machine. For example, seventy-two units placed at twenty-inch spacing on a 120 ft. boom will add less than 45 lbs. to the entire boom weight. Thus, there is little negative impact on the boom structure.

The brushes in the device of the present invention are able to prevent wind speeds up to 25 mph flowing through the boom structure from having any negative effect on proper spray pattern development or the structure of the boom.

Thus and to summarize the advantages of this invention: (1) each nozzle has its own spoiler device unlike prior art devices which tend to be an entire cover; (2) the space between the spoiler devices on the boom assists with air circulation through the boom without enhancing air drift, and (3) the flexible brushes are the only pieces protruding below the boom structure that can flex if they unexpectedly contact the ground or an obstacle, which prevents boom structure damage.

The objects and advantages of the invention will appear more fully from the following detailed description of the preferred embodiment of the invention made in conjunction with the accompanying drawings.

DETAILED DESCRIPTION OF PREFERRED EMBODIMENT OF THE INVENTION

The Field Sprayer 10

Figure 1:
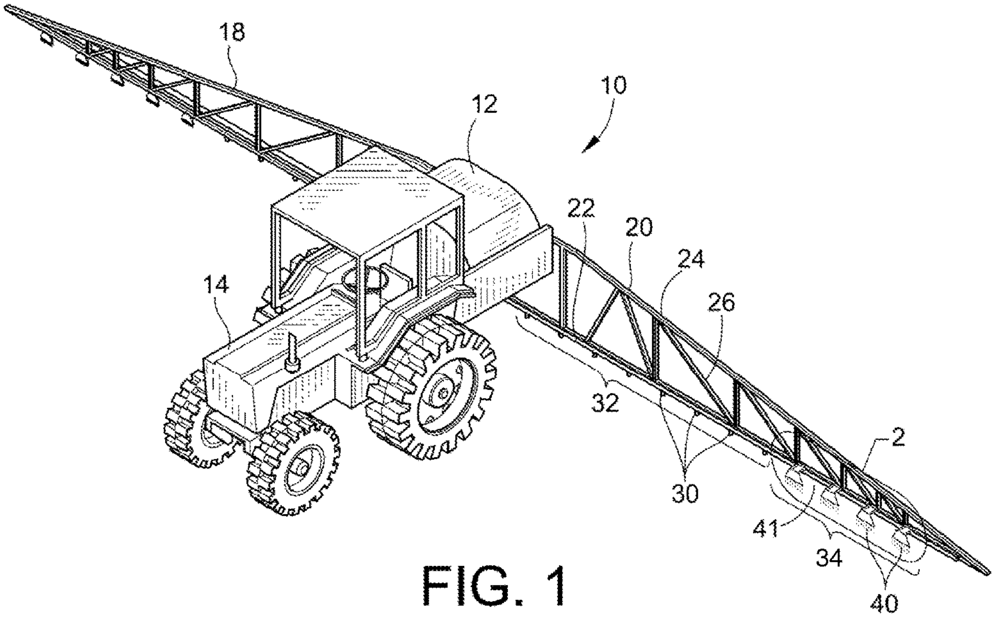
FIG. 1 is a perspective view illustrating a conventional field sprayer unit mounted on a tractor.

Reference is made to FIG. 1 which illustrates a conventional field sprayer 10 which includes a liquid supply tank 12 mounted on a tractor 14. Field sprayers are well known to the industry. Reference is made to U.S. Pat. No. 4,927,080 to Alsing and U.S. Pat. No. 4,641,781 to McCrea et al., which are incorporated herein by reference for a description to typical field sprayers of the present invention. While a tractor 14 is illustrated, it is within the scope of the present invention to have other means for supporting liquid supply tank 12.

Mounted on either side of the tractor 14, there are conventional spray booms 18, 20 which extend outwardly and include elongated support frames. As illustrated, the field sprayer 10 is mounted to the back of the tractor 14. However, it is within the scope of the present invention to have a separate sprayer system attached to a trailer (not shown) which is hitched to the tractor 14. The trailer would then be mounted on ground wheels. It is also within the scope of the present invention to include support wheels for the booms 18, 20 if necessary.

A liquid supply line 22 within the booms 18, 20 extends from the liquid supply tank 12 outwardly along the frame 24 and supported on a number of brackets 26 which are welded to the frame 24. A plurality of nozzles 30 are positioned along the line 22 at suitable locations to provide a spray which can be adjusted to provide complete coverage of the ground.

Under normal (prior art) circumstances, the nozzles 30 are not shielded, as illustrated by the section designated 32. However, the system of the present invention is defined by a series of spoiler devices 40, illustrated by the section designated 34 in FIG. 1. The section designated 34 in FIG. 1 is expanded in FIG. 2. The system of the present invention preferably includes one spoiler device 40 placed in front of each nozzle 30 on both booms 18, 20.

Figure 2:
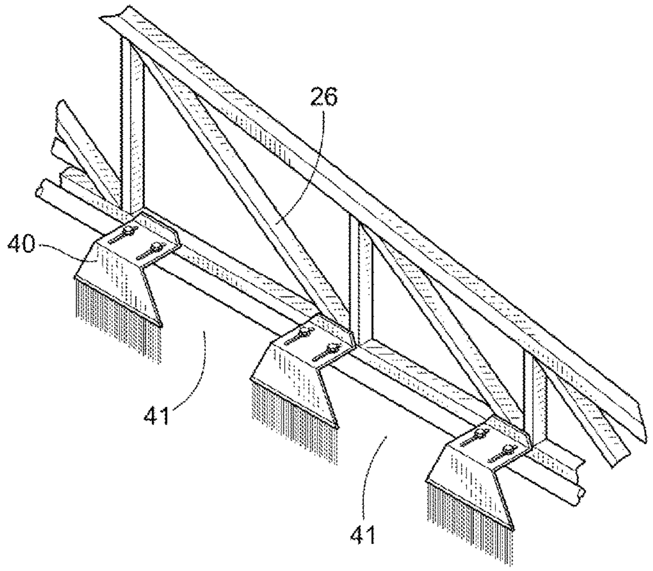
FIG. 2 is a perspective view of a portion of the right hand boom taken from section 2 of FIG. 1.
Figure 4:
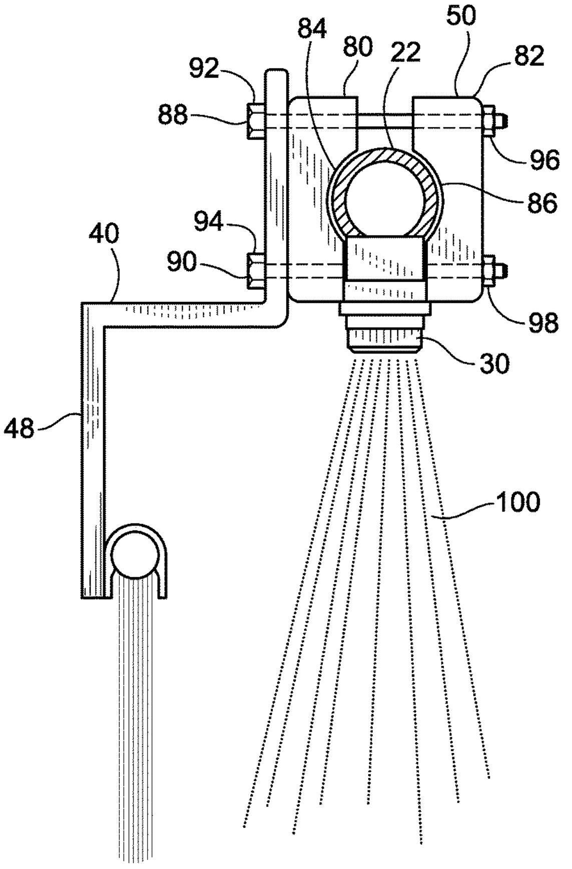
FIG. 4 is a side plan view of the spoiler device mounted on the boom of the field sprayer.
Figure 5:
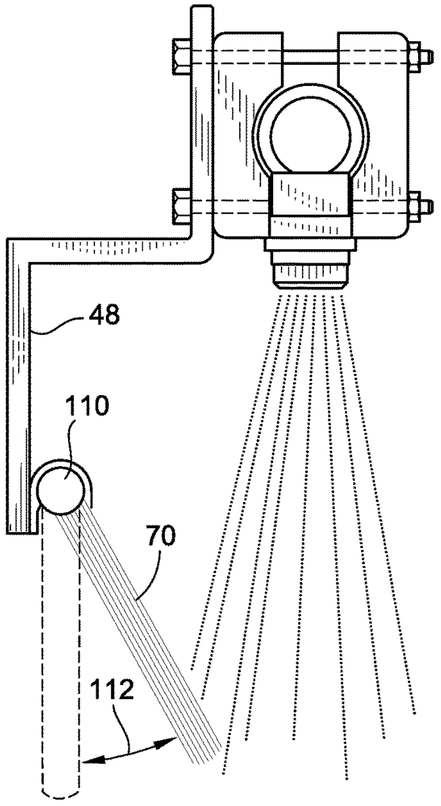
FIG. 5 is an alternative embodiment of a side plan view of the spoiler device of the present invention mounted on the boom of the sprayer device.

The Spoiler Device 40:

FIG. 2 illustrates a series of four spoiler devices 40 as mounted on the liquid supply line 22 of the right boom 20. With regard to fastening, mounting, attaching or connecting the spoiler devices 40 to the boom, unless specifically otherwise described, conventional mechanical fasteners and methods may be used. Appropriate fastening and attaching methods include adhesives, welding and soldering. In addition, and as illustrated in FIGS. 4 and 5, the spoiler device 40 can be affixed to the liquid supply line 22 by means of an adjustable and removable collar 50 known to the art.

Figure 3:
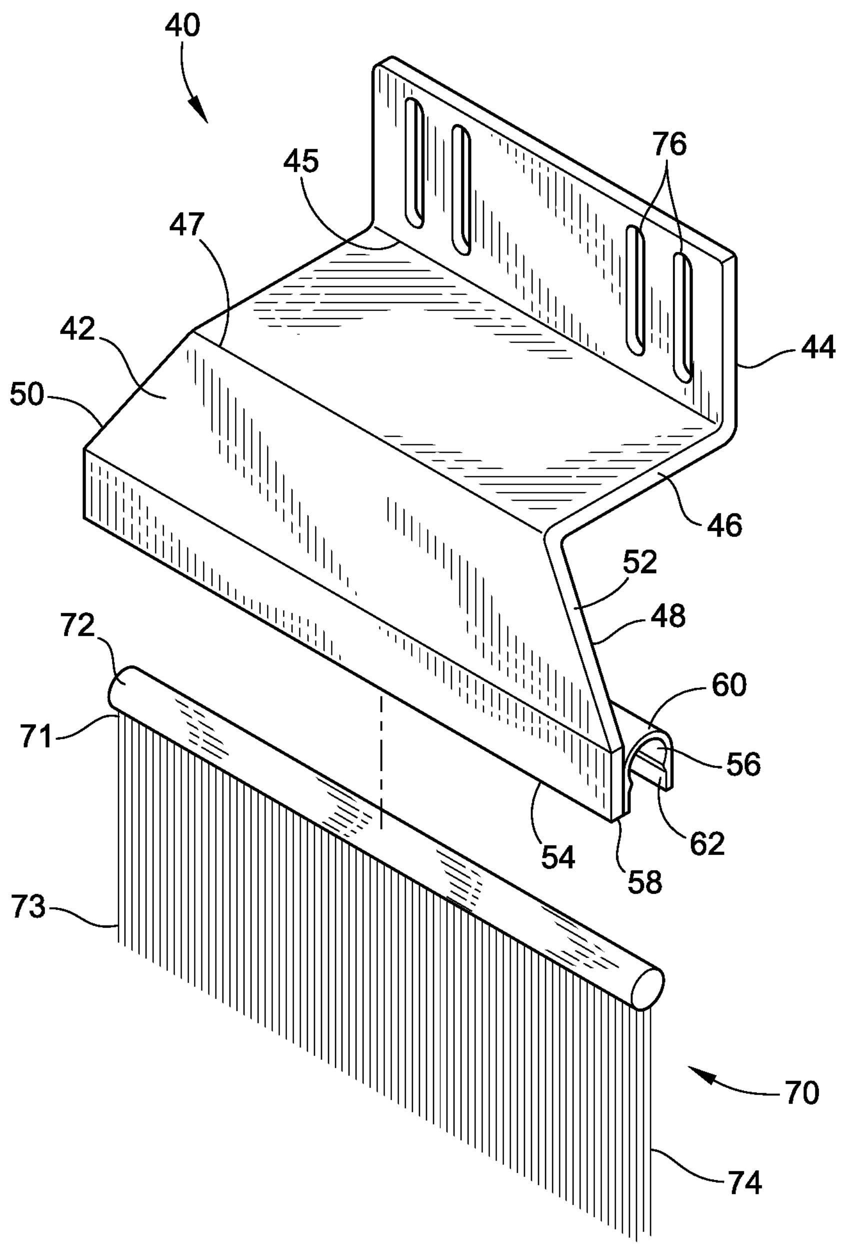
FIG. 3 is a perspective exploded view of one of the spoiler devices of the present invention.

Referring now to FIG. 3, the spoiler device 40 is typically a one piece sheet 42 of metal or plastic. Preferably, the sheet 42 is aluminum sheeting. However, other metals such as iron and steel, metallic alloys and ceramics, and polyurethane or other plastics can be used to create the sheet 42. While the sheet can be extruded in the form illustrated in FIG. 3, it is also within the scope of the present invention to stamp out a linear form for the sheet 42 and then mold or bend the sheet 42 into the desired configuration by means known to the art. Such configuration will then include an attachment section 44 connected to an extended shelf 46 at intersection 45 and a downwardly depending deflector 48 connected to the shelf 46 at intersection 47. While the attachment section 44 and the deflector 48 are shown positioned next to the shelf 46 at about a 90° angle, it within the scope of the present invention to decrease or increase the angle at intersections 45 and 47 as desired by the field sprayer operator. As illustrated in FIG. 3, the deflector 48 is preferably flared outwardly at sides 50, 52 to create a greater spray barrier. Referring to the attachment section 44, there is illustrated a series of channels 76 which are designed to adjustably assist the attachment of the spoiler device 40 to the field sprayer 10. Alternatively, the channels can be placed on the shelf 46 as illustrated in FIG. 2.

Brush 70:

If desired, the lower end 54 of the deflector 48 can be defined by a channel 56 for receiving a flexible brush 70 therein. While the channel 56 can be separately attached to the lower end 54 of the deflector 48 by adhesives or other means, it is also within the scope to form the deflector 48 of the spoiler device 40 with an extension which is bent and wrapped behind the deflector 48 to form a fold line 58. The material is then further bent to form a ceiling 60 and an interior wall 62 resulting in the channel 56.

The brush 70 is defined by a solid backing 72, preferably formed of metal or plastic, which serves to crimp and hold the proximal end 71 of the flexible bristles or filaments 74 of the brush 70. The backing 72 may then be slidably mounted within the channel 56 to attach the brush structure 70 to the spoiler device 40. The bristles 74 then extend downwardly. The bristles 74 may be of any length depending on the particular construction of the field sprayer 10 and the needs of the operator. The distal end 73 of the brush 70 is designed to pass over or brush the tops of the crops in the ground. Because of the flexibility of the bristles 74, the brush 70 will pass through and between the crops without damaging them. Further, the brush 70 will provide an adequate barrier for the nozzle spray 100 to prevent wind drift. It is to be noted that the flexible brushes 70 are the only pieces protruding below the boom 18 structure that can flex if they unexpectedly contact the ground or an obstacle, which prevents boom structure damage.

While bristles 74 are illustrated in the drawings, it is contemplated that any semi-flexible material could be used as an alternative without deviating from the scope of the present invention. For example, the bristle 74 could be replaced by a solid piece of flexible rubber or strips of flexible rubber. In addition, the spoiler device 40 of the present invention can be used without the brush 70 if desired.

Attaching the Spoiler Device 40 to the Boom:

Reference is now made to FIG. 4, which illustrates a preferred method for attaching the spoiler device 40 to the liquid supply line 22 along the frame 24 of either boom 18, 20 in the spraying system 10. The collar 50 is defined by two collar sections 80 and 82, each of which has facing semi-circular openings 84, 86 to receive the liquid supply line 22. Attachment mechanisms 88, 90, generally in the form of a standard bolt 92, 94 and nut 96, 98 passing through the series of channels 76 in the attachment section 44 in order to mount the collar 50 thereon and surround the liquid supply line 22. By tightening the nuts 96, 98 on the bolts 92, 94, the spoiler device 40 can be mounted to the sprayer device 10 in front of each nozzle 30. The extended length of each of the channels 76 in the attachment section 44 allows for vertical adjustment of the spoiler device on the liquid supply line 22. In this manner, the deflector portion 48 of the spoiler device 40 is placed in front of a nozzle 30 at the forward section of the boom to deflect wind and air current from the spray 100 exiting the nozzle 30 and also to confine the spray 100 to the area immediately surrounding the nozzle 30, thereby enabling the spray to reach the ground or crop with minimum air drift.

Referring to FIG. 5, there is an alternative embodiment of the spoiler device 40 in which the brush mechanism 70 is attached to the deflector 48 by means of a rotatable hinge assembly 110 thereby allowing the brush 70 to rotate inwardly, as illustrated by the arrow 112. In this manner, the spoiler device 40 can accommodate obstacles on the ground or thick crop stalks which might cause bending or sheering of the spoiler device 40 from the booms 18, 20 of the field sprayer 10.

Thus, the spoiler device 40 is easily clamped onto any existing spray boom 18, 20 of a conventional field sprayer 10 in front of the spray nozzles 30, thereby blocking wind and air turbulence. The spoiler device 40 works by moving air away from the nozzle tips 30 allowing the spray pattern to develop and be placed precisely where the operator wishes to have it be placed.

While not illustrated, it is within the scope of the present invention to incorporate the spoiler device 40 directly into the nozzle structure 30 by injection molding or other similar manufacture techniques known to the art. Thus, the spoiler device 40 and the nozzle unit 30 could be manufactured as on complete assembly.

In Operation:

In operation, as shown primarily in FIG. 1, the height of the booms 18, 20 are positioned to pass over the top of the crops, and the field sprayer 10 moves along the rows of crops on a field. The placement of the each spoiler device 30 in front of each nozzle 30 on the booms 18, 20 will serve the effect of inhibiting air turbulence caused by the movement of the field sprayer 10 and other environment factors from affecting the download flow of the spray 100 from each nozzle 30 as illustrated in FIG. 4. The nozzle 30 will be preferably adjusted so that it sprays onto the crop behind each sheet 42 of the spoiler device 40. Therefore, the spray 100 has an ideal chance of hitting its intended target. As illustrated in FIGS. 1 and 2, there are openings 41 between each spoiler device 40 to allow air to pass through the field sprayer 10 thereby cutting wind drag to the booms 18, 20 of the field sprayer 10 and equalizing air pressure in front of and behind each spoiler device 40, which also assists in avoiding adverse wind drift effects on the nozzle spray 100.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices and methods of the present invention can comprise, consist of, or consist essentially of the essential elements and limitations described herein, as well as any additional or optional steps, ingredients, components, or limitations described herein or otherwise useful in the art.

It is understood that the invention is not confined to the particular construction and arrangement of parts herein illustrated and described.

We claim:

1. A field spraying device for spraying a liquid on over the top of a crop, comprising:

a. a liquid supply tank;

b. at least one spray boom extending from the device, the spray boom having a forward side facing the directional movement of the field spraying device in operation and an opposing rearward side, wherein the boom includes a liquid supply line connected to a plurality of nozzles along the length of the boom, wherein the plurality of nozzles spray the liquid over the top of a crop;

c. a plurality of wind drift spoiler devices wherein each of the plurality of wind drift spoilers are positioned adjacent one of the plurality of nozzles on the forward side of the spray boom, wherein the wind drift spoiler device comprises a solid, non-absorbent downwardly depending deflector surface adjacent the nozzle to provide a solid air turbulence deflector barrier for the liquid sprayed from the nozzle, wherein the wind drift spoiler device includes a downwardly depending brush element, wherein the brush element is positioned to depend downwardly from the deflector surface, and d. air passes through openings between each of the plurality of wind drift spoiler devices.

2. The field spraying device of claim 1 wherein the wind drift spoiler devices are mounted on the liquid supply line.

3. The field spraying device of claim 2 wherein the wind drift spoiler devices comprise attachment openings to facilitate attachment of the spoiler devices to the liquid supply line.

4. The field spraying device of claim 1 wherein the wind drift spoiler device comprises flared ends.

5. The field spraying device of claim 1, wherein the deflector surface comprises a channel for receiving the brush element.

6. The field spraying device of claim 1, wherein the deflector surface comprises a channel for receiving the brush element.

7. The field spraying device of claim 1, wherein the deflector surface comprises a channel for receiving the brush element.

8. The field spraying device of claim 1, wherein the deflector surface comprises a channel for receiving the brush element.

9. A field spraying device for spraying a liquid on over the top of a crop, comprising:

a. a liquid supply tank;

b. at least one spray boom extending from the device, the spray boom having a forward side facing the directional movement of the field spraying device in operation and an opposing rearward side, wherein the boom includes a liquid supply line connected to a plurality of nozzles along the length of the boom, wherein the plurality of nozzles spray the liquid over the top of a crop;

c. a plurality of wind drift spoiler devices wherein each of plurality of wind drift spoiler devices is position adjacent each of the nozzles on the forward side of the spray boom, wherein the wind drift spoiler devices each include a solid, non-absorbent downwardly depending deflector surface adjacent each of the nozzles to provide a solid air turbulence deflector barrier for the liquid sprayed from the nozzles, wherein the wind drift spoiler device includes a downwardly depending brush element, wherein the brush element is positioned to depend downwardly from the solid, non-absorbent deflector surface, wherein the deflector surface comprises a channel for receiving the downwardly depending brush element, and d. air passes through openings between each of the plurality of spoiler devices.

10. The field spraying device of claim 9 wherein the wind drift spoiler devices are mounted on the liquid supply line.

11. The field spraying device of claim 9 wherein the wind drift spoiler devices comprise attachment openings to facilitate attachment of the spoiler devices to the liquid supply line.

12. The field spraying device of claim 9 wherein the wind drift spoiler device comprises flared ends.

13. The field spraying device of claim 9 wherein the brush element comprises downwardly depending flexible filaments.

14. The field spraying device of claim 9 wherein the brush element is designed such that the brush element passes directly overhead the crop.

15. The field spraying device of claim 9 wherein the brush element is hingedly attached to the deflector surface.

* * * * *